United States Patent
Sundaram (10) Patent No.: US 10,554,304 B2
(45) Date of Patent: Feb. 4, 2020

(54) MECHANISM FOR MIPI COMMUNICATION USING OPTICAL INTERFACE

(71) Applicants: Intel Corporation, Santa Clara, CA (US); Arvind Sundaram, Bangalore (IN)

(72) Inventor: Arvind Sundaram, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/326,723

(22) PCT Filed: Sep. 29, 2016

(86) PCT No.: PCT/US2016/054396
§ 371 (c)(1),
(2) Date: Feb. 20, 2019

(87) PCT Pub. No.: WO2018/063233
PCT Pub. Date: Apr. 5, 2018

(65) Prior Publication Data
US 2019/0207681 A1  Jul. 4, 2019

(51) Int. Cl.
*H04B 10/112* (2013.01)
*H04B 10/80* (2013.01)
(Continued)

(52) U.S. Cl.
CPC .......... *H04B 10/40* (2013.01); *H04B 10/516* (2013.01); *H04B 10/69* (2013.01); *H04B 10/803* (2013.01);
(Continued)

(58) Field of Classification Search
None
See application file for complete search history.

(56) References Cited

U.S. PATENT DOCUMENTS

2011/0206381 A1  8/2011  Ji et al.
2013/0110447 A1  5/2013  Gettemy et al.
(Continued)

FOREIGN PATENT DOCUMENTS

EP          307651 A1   9/2016
WO  WO-2018063233 A1   4/2018

OTHER PUBLICATIONS

"International Application Serial No. PCT/US2016/054396, International Search Report dated May 24, 2017", 3 pgs.
(Continued)

*Primary Examiner* — Li Liu
(74) *Attorney, Agent, or Firm* — Schwegman Lundberg & Woessner, P.A.

(57) ABSTRACT

An apparatus comprises a laser emitter configured to transmit laser energy across an air gap to a separate device; a mobile industry processor interface (MIPI); driver circuitry electrically coupled to the laser emitter, wherein the driver circuitry is configured to receive an electrical signal according to an MIPI protocol and drive the laser emitter according to the electrical signal; a tone circuit configured to generate a tone signal of a specified tone frequency; and an MIPI mode detection circuit electrically coupled to the driver circuitry and the MIPI, wherein the MIPI mode detection circuit is configured to detect a change between a MIPI low power (LP) mode and a MIPI high speed (HS) mode at the MIPI interface, and add the tone signal to an electrical signal provided to the driver circuitry from the MIPI according to the detected change.

24 Claims, 9 Drawing Sheets

(51) Int. Cl.
*H04B 10/516* (2013.01)
*H04B 10/40* (2013.01)
*H04Q 11/02* (2006.01)
*H04B 10/69* (2013.01)
*H04J 14/08* (2006.01)

(52) U.S. Cl.
CPC .............. *H04J 14/08* (2013.01); *H04Q 11/02* (2013.01); *H04J 2203/0066* (2013.01); *H04Q 2213/13407* (2013.01)

(56) References Cited

U.S. PATENT DOCUMENTS

| | | | |
|---|---|---|---|
| 2013/0230318 A1* | 9/2013 | Kim ..................... | H04B 10/801 398/43 |
| 2015/0199291 A1 | 7/2015 | Marena et al. | |
| 2016/0182154 A1 | 6/2016 | Fang et al. | |
| 2017/0019186 A1* | 1/2017 | Wiley .................. | H04B 10/801 |

OTHER PUBLICATIONS

"International Application Serial No. PCT/US2016/054396, Written Opinion dated May 24, 2017", 6 pgs.
"International Application Serial No. PCT US2016 054396, International Preliminary Report on Patentability dated Apr. 11, 2019", 8 pgs.

\* cited by examiner

MECHANISM FOR MIPI COMMUNICATION USING OPTICAL INTERFACE

CLAIM OF PRIORITY

This patent application is a U.S. National Stage Application under 35 U.S.C. 371 from International Application No. PCT/US2016/054396, filed Sep. 29, 2016, published as WO2018/063233, which is incorporated herein by reference.

TECHNICAL FIELD

Embodiments pertain to high speed interconnections in electronic systems, and more specifically to optical communication interfaces between electronic devices.

BACKGROUND

Electronic systems often include electronic devices that communicate signals to each other. Designers of electronic systems strive to increase the speed of the communication among devices while keeping the communication link robust. Wireless connections can be more robust than wired connections because of the elimination of the need for mechanical contact that may be susceptible to wear. Wireless interfaces typically communicate using radio frequency (RF) signals. However, some limitations of RF communication interfaces include bandwidth limitations, signal interference, and overhead associated with RF protocols. Optical signals can be an alternative to RF and can achieve higher data rates. However, traditional optical interconnects require special fiber-optic cables, which can be more expensive than wired interfaces, and can require air tight glass-to-glass connections to prevent Fresnel reflections, making them less desirable and, in certain examples, impractical for day-to-day free-air interconnects. There is a general need for devices, systems and methods to address requirements for high-speed interconnections among electronic devices.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

There are many types of communication interfaces between electronic devices. These include universal serial bus (USB), mobile industry processor interface (MIPI), peripheral component interconnect (PCI), PCI express (PCIe), high definition multimedia interface (HDMI), thunderbolt (TBT), display port (DP) interface, and other serial busses and serial-parallel busses used in consumer electronics, enterprise class devices, wearable electronic devices, portable computers, and tablet computers. It is desirable to implement a wireless communication interface that can provide improved data rate and can adapt basic wireless interconnection with all of the protocols available and yet not be tied to any one specific protocol. An infrared-based (IR-based) interface is an alternative to an RF interface, but an IR-based interface involves conversion between protocols, which adds overhead to the communication. A laser-based optical interface would meet these requirements for the interconnection, but the cost of fiber optic based optical interconnections can be prohibitive.

An improvement would be a laser-based optical interface that does not use fiber optics to transmit and receive the laser emitted signals, but instead transmits the optical signals via free air space (e.g., a light amplitude modulation docking adapter, or LAMDA). This can be accomplished by communicating the optical signals over short distances (e.g., about ten millimeters, or 10 mm) so that signal loss is tolerable. The free air optical interface can scale to data rates up to ten gigabits per second (10 Gbps) and rates of one terabit per second (1 Tbps) may be available. This type of optical interface is not tied to any specific protocol and eliminates protocol overhead, which reduces the latency in communication to near zero latency. Further, this type of optical interface is agnostic to clock rate, making the interface compatible with high speed and low speed interfaces.

Figure 1:
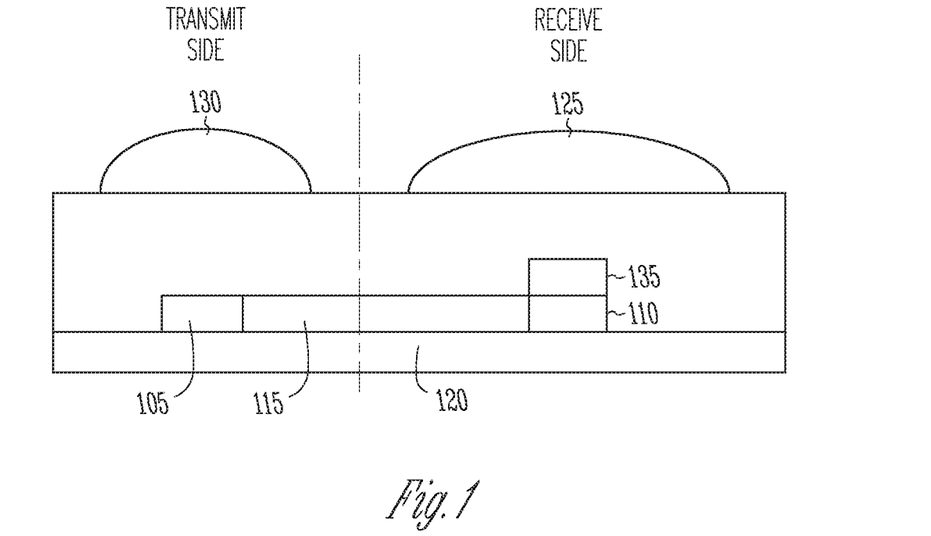
FIG. 1 is an illustration of an optical transmitter (TX) receiver (RX) pair in accordance with some embodiments.

FIG. 1 is an illustration of an embodiment of an optical transmitter (TX) receiver (RX) pair. The optical TX/RX pair can include a laser emitter 105, such as a laser diode or a vertical-cavity surface emitting laser (VCSEL) for example. The optical receiver can include a photodiode 110 to convert received laser energy into an electrical signal. When laser light falls on the photodiode 110, it produces a photo diode current. The current produced is proportional to the amount of laser light incident on the photodiode 110. When the laser light is modulated, the photodiode current varies with the intensity of the incident laser light. Data is received by detecting the laser modulation using the photodiode current.

A trans-impedance amplifier 115 (TIA) can be used to amplify the electrical signals generated by the photodiode 110. In some examples, the TIA provides an average of the photodiode current generated by the photodiode 110. The laser emitter 105, the photodiode 110 and the TIA 115 are arranged on a substrate 120. Some examples of the substrate 120 include a printed circuit board (PCB) made of plastic, plastic laminate (e.g., FR4) or ceramic.

To form a serial duplex optical interface, a second optical TX/RX pair can be positioned opposite the optical TX/RX pair in FIG. 1. The laser emitter of the second optical TX/RX pair is arranged opposite the optical receiver of the first optical TX/RX pair to create a first communication lane, and the laser emitter of the first optical TX/RX pair is arranged opposite the optical receiver of the second TX/RX pair to form a second communication lane in the reverse direction from the first communication lane. An air gap separates the two TX/RX pairs. The separation between the two optical TX/RX pairs is small (e.g., about 2.5 mm). The small separation allows for the receivers to reliably detect the laser energy from the laser emitters. The TX/RX pair can include a lens 125 to focus incident laser energy onto the photodiode 110. The TX/RX pair may also include a second lens 130 to focus the emitted laser energy toward the receiving photodiode across the air gap. The lenses 125, 130 may be epoxy molded lenses.

Figure 2:
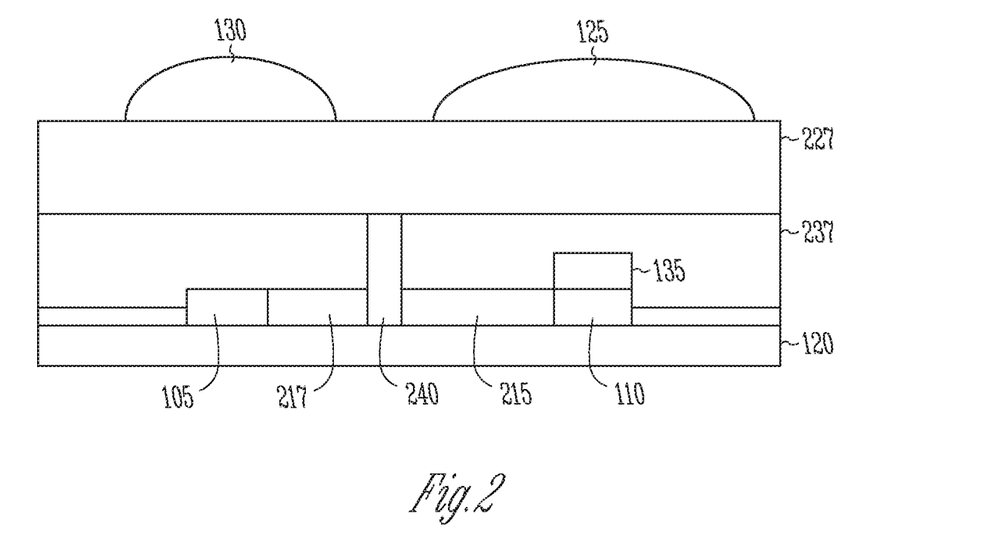
FIG. 2 is an illustration of another optical TX/RX pair in accordance with some embodiments.

FIG. 2 is an illustration of another embodiment of an optical transmitter TX/RX pair. A trans-impedance amplifier 215 (TIA) can be used to amplify the electrical signal generated by the photodiode 110. A drive amplifier 217 may also be included to translate signals to be transmitted to levels of power or voltage needed to drive the laser emitter 105. A resin 237 may be disposed on the substrate to encapsulate the electronics. The resin may be an optically clear resin (OCR) that flows before hardening. However, OCR may be susceptible to scratching. Because the optical interface is exposed to air rather than being protected using connections to fiber-optics, the optical TX/RX pair may need a surface with a higher degree of hardness than a resin can provide.

The optical TX/RX pair may include a lens 227. The lens may have a surface hardness rating of 8H or higher. The lens 227 can include a first lens portion 125 having a first curvature arranged above the photodiode 110 and a second lens portion 130 having a second curvature arranged above the laser emitter 105. The lens may be pre-formed prior to assembly and may include alumina silicate glass or a co-polymer coated poly(methyl methacrylate) (PMMA), such as sol-gel coated PMMA for example. The lens may have the same refractive index as the OCR to prevent reflections at the OCR/lens interface. The lens may also provide protection from humidity. An isolation barrier 240 may be arranged on the substrate between the laser emitter and the photodiode. The isolation barrier 240 may extend from the substrate to the top surface of the resin and may also serve as a support for the lens during curing of the resin.

In some embodiments, the photodiode 110 has a wide spectral response (e.g., an indium gallium arsenide (InGaAs) photodiode). The wide spectral response is desirable for detection of laser energy transmitted over air, but can cause problems of crosstalk between the two communication lanes. To reduce or eliminate crosstalk between communication lanes, a laser bandpass filter 135 is arranged above the photodiode 110 of each TX/RX pair. In some embodiments, the laser bandpass filter 135 can be a Lyot filter or a dichroic filter arranged above the photodiode 110. In some embodiments, the laser bandpass filter 135 is formed as a coating (e.g., an anti-reflective coating, or ARC) on the photodiode using ion beam sputtering (IBS). In some embodiments, the laser bandpass filter 135 is formed as a coating on the lens 125.

The laser bandpass filter 135 of a TX/RX pair has a passband that excludes the center frequency of the laser energy emitted by the laser emitter 105 of the TX/RX pair, but the passband includes the center frequency of the laser energy emitted by the laser emitter of the communication lane of the photodiode 110. Thus, the laser bandpass filter 135 reduces or eliminates laser energy from one communication lane from being detected by the other communication lane. In some embodiments, the center frequency of a laser emitter is assigned based on whether the laser emitter is included in a host device (e.g., a computing device or a mobile communication device) or a peripheral device (e.g., a disk drive). If a TX/RX pair is included in a host device, the TX/RX pair includes a laser emitter having a first center frequency and a laser bandpass filter that excludes the first center frequency. If a TX/RX pair is included in a peripheral device, the TX/RX pair includes a laser emitter having a second center frequency and a laser bandpass filter that excludes the second center frequency and passes the first center frequency. The TX/RX pair of the host device includes a laser bandpass filter that passes the second center frequency. Thus, the passband of the laser bandpass filter may be selected according to whether the TX/RX pair is included in the host device or peripheral device.

Figure 3:
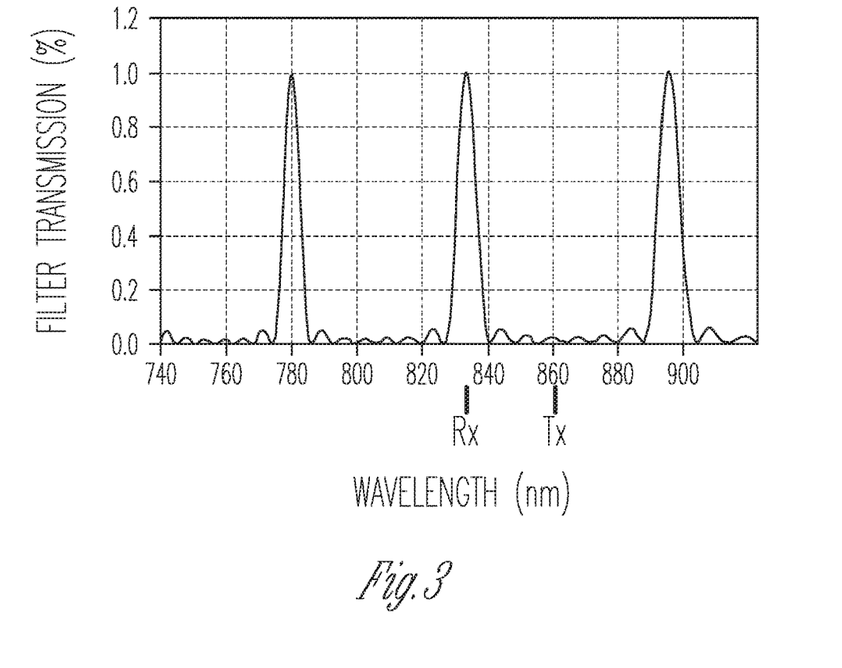
FIG. 3 is an example of a filter characteristic for a laser bandpass filter in accordance with some embodiments.

FIG. 3 is an example of a filter characteristic for a laser bandpass filter. The example is intended to be illustrative and non-limiting. The filter characteristic shows filter transmission versus wavelength. In the example, a host device laser emitter emits laser energy with a wavelength of 855 nanometers (nm), and a peripheral laser emitter emits laser energy with a wavelength of 830 nm. FIG. 3 shows an example of a filter characteristic for the host device. The filter shows very high attenuation at 855 nm and shows that the passband of the filter includes 830 nm.

Figure 4:
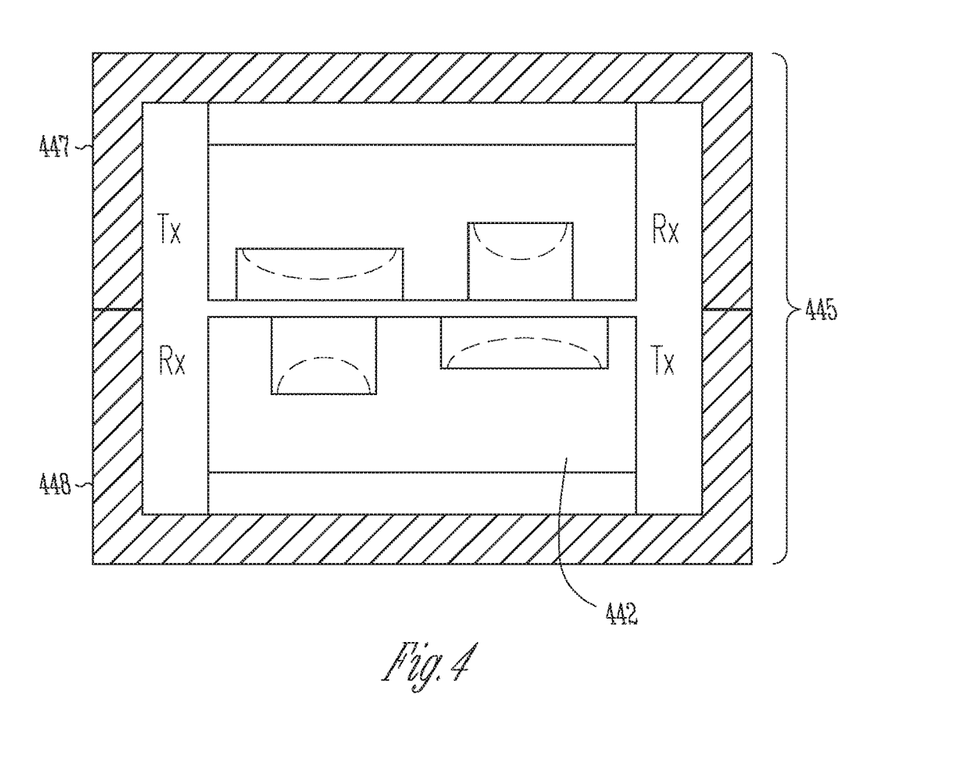
FIG. 4 is an illustration of an arrangement of optical TX/RX pairs in accordance with some embodiments.

FIG. 4 is an illustration of an embodiment of an arrangement between optical TX/RX pairs of the host-side of the optical interface and the peripheral-side of the optical interface. An optical TX/RX pair may be electrically connected to logic circuitry 442 on the substrate. The logic circuitry 442 transmits and receives signals communicated according to a duplex communication protocol, such as a USB protocol. In certain embodiments, the substrate is an electronics package substrate and the laser emitter, the photodiode, and the logic circuitry 442 may be included in the same electronics package. The optical interface can include a mechanical connector 445 to house the interface and protect against interference from outside sources. The mechanical connector 445 may include first connector body portion 447 and a second connector body portion 448. The optical interface host side can be included in the first connector body portion 447 and the optical interface peripheral side can be included in the second connector body portion 448. Mating the two connector body portions places the TX laser emitters opposite the RX photodiodes across a small air gap or air space to form the communication lanes of the optical interface. Data is sent between devices or between optical links of the optical interface by transmitting laser energy via free air.

Figure 5:
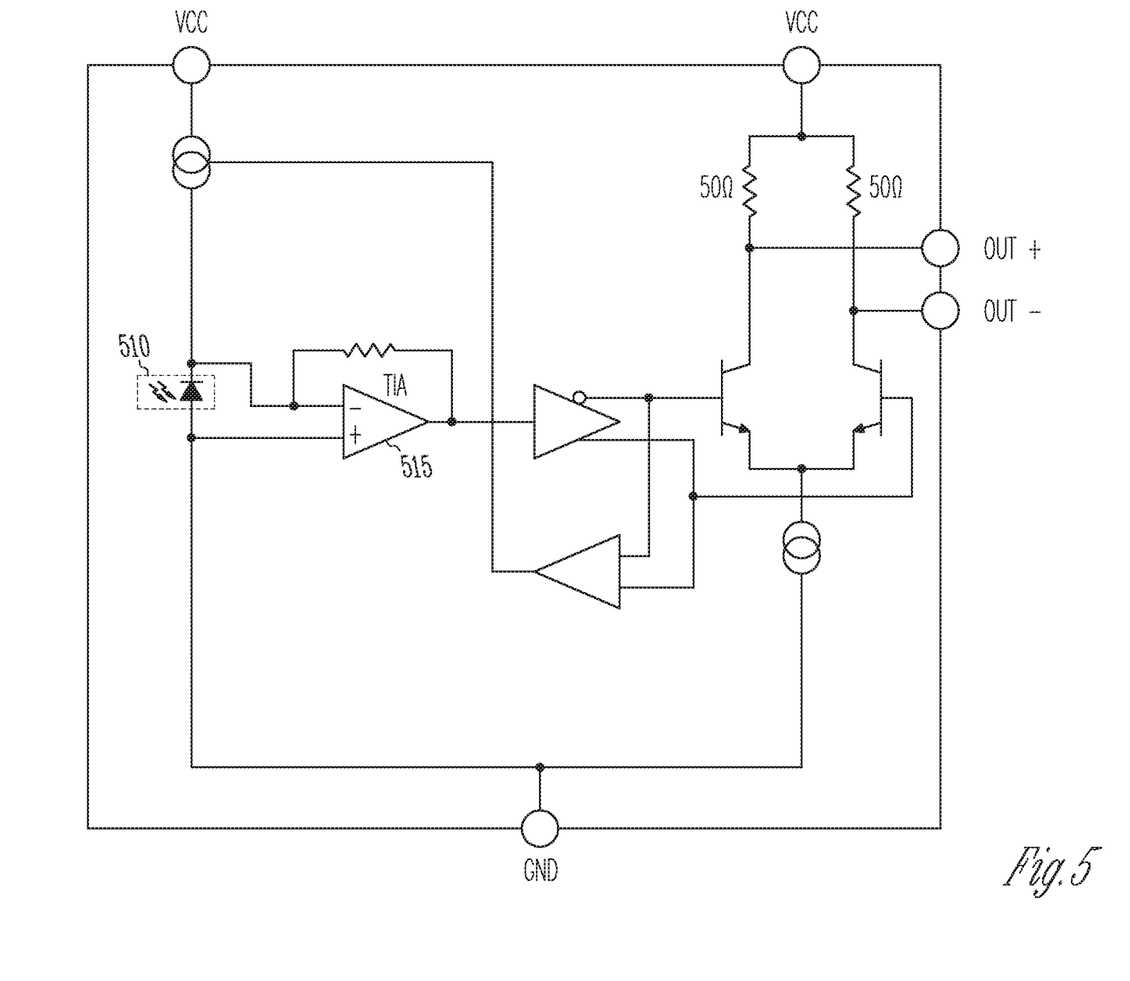
FIG. 5 is a schematic of an embodiment of an optical electronic circuit on the receive side of the optical interface in accordance with some embodiments.

FIG. 5 is a schematic of an embodiment of an optical electronic circuit on the RX side of the optical interface. The receiver circuitry includes a photodiode 510 and a TIA 515. The optical electronic circuit receives optical signals (e.g., data of ones and zeros) and translates the optical signals to electrical signals. A differential output (OUT+, OUT−) of the receiver circuitry may be electrically coupled to logic circuitry that provides the electrical data to a processor.

Figure 6:
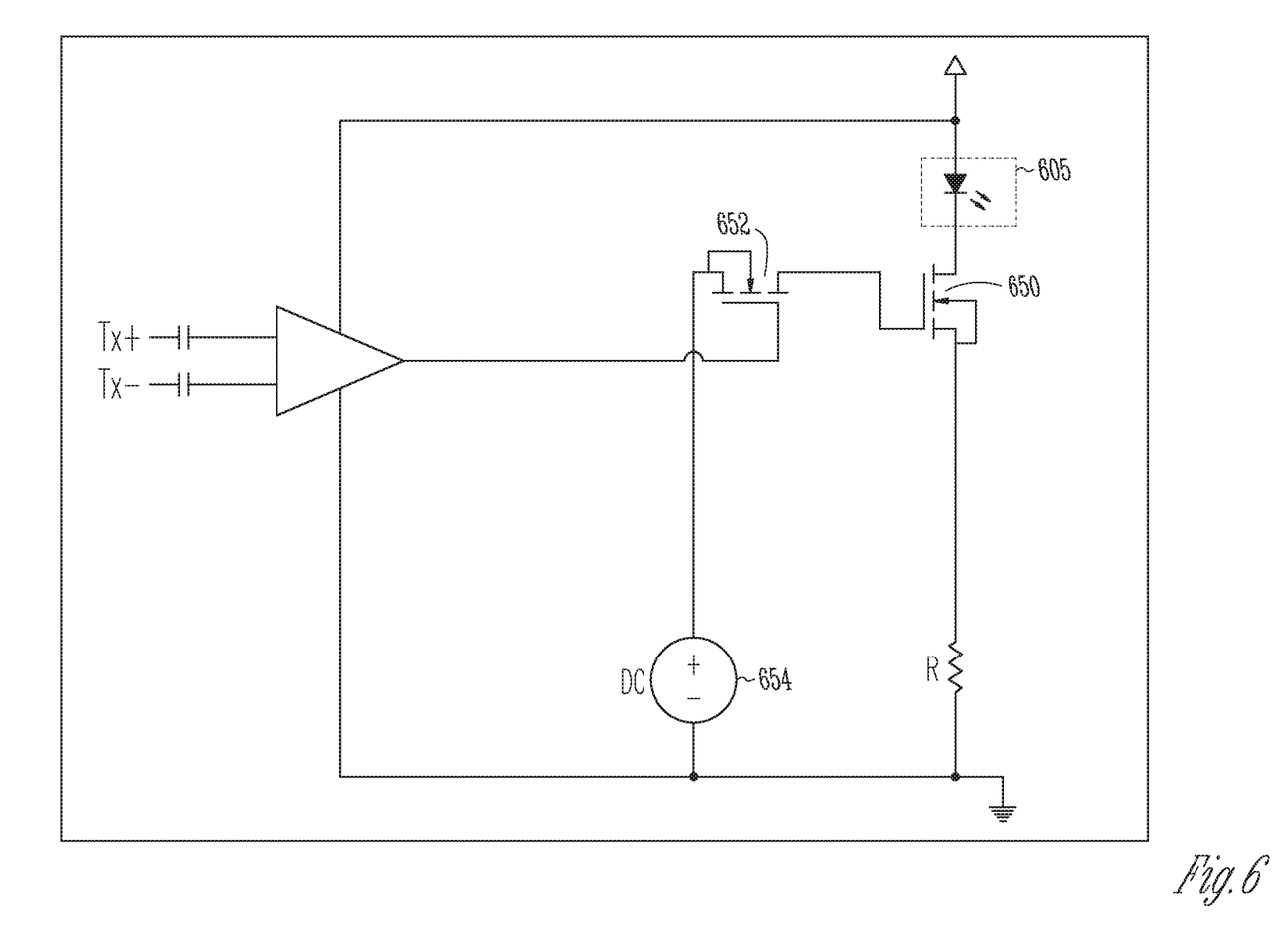
FIG. 6 is a schematic of an embodiment of an optical electronic circuit on the transmit side of the optical interface in accordance with some embodiments.

FIG. 6 is a schematic of an embodiment of an optical electronic circuit on the TX side of the optical interface. The TX circuit includes a laser emitter 605 and driver circuitry. The driver circuitry is electrically coupled to the laser emitter 605 and an electrical interface TX+ TX−. The driver circuitry receives an electrical signal at the electrical interface and drives the laser emitter according to the electrical signal. In the embodiment of FIG. 6, the driver circuitry includes a current sink circuit that includes field effect transistor (FET) 650 and resistor R. In certain embodiments, FET 650 is a high electron mobility transistor (HEMT). The driver circuitry also includes FET 652 connected to the current sink. A high voltage at the input activates the gate of FET 652 to apply bias voltage 654 to the gate of FET 650 to activate the current sink. The laser emitter 605 can be turned on to indicate a logic '1'. A low voltage at the input inactivates FETs 652 and 654 and the laser emitter can be turned off to indicate a logic '0'. Alternatively, turning the laser emitter 605 off can signify a logic '1' and turning the laser emitter on can signify a logic '0'.

As explained previously herein in regard to FIG. 4, a first TX/RX pair can be arranged opposite a second TX/RX pair to form a communication lane. The TX laser emitters are arranged opposite the RX photodiodes across the air gap or air space of the optical interface. Each TX/RX pair can include the receiver circuitry and the driver circuitry. The receiver circuitry and the driver circuitry may be included on the same substrate as the photodiodes and laser emitters or can be packaged separately. The communication lane allows for communication of data in both directions to provide duplex communication across the optical interface.

The optical interface can be transparent to a processor on either side of the optical interface. The processor may communicate data according to a duplex communication protocol for an electrical interface and does not need to change any timing of the protocol to allow for the optical interface. For example, the processor may communicate logic signals according to a USB protocol. Communication of the logic signals using the optical interface can be transparent to the processor. A complication arises for communicating over the optical interface according to a MIPI protocol. The MIPI can communicate signals in multiple modes and the MIPI physical layer can use multiple voltage levels for communicating according to the different modes.

Figure 7:
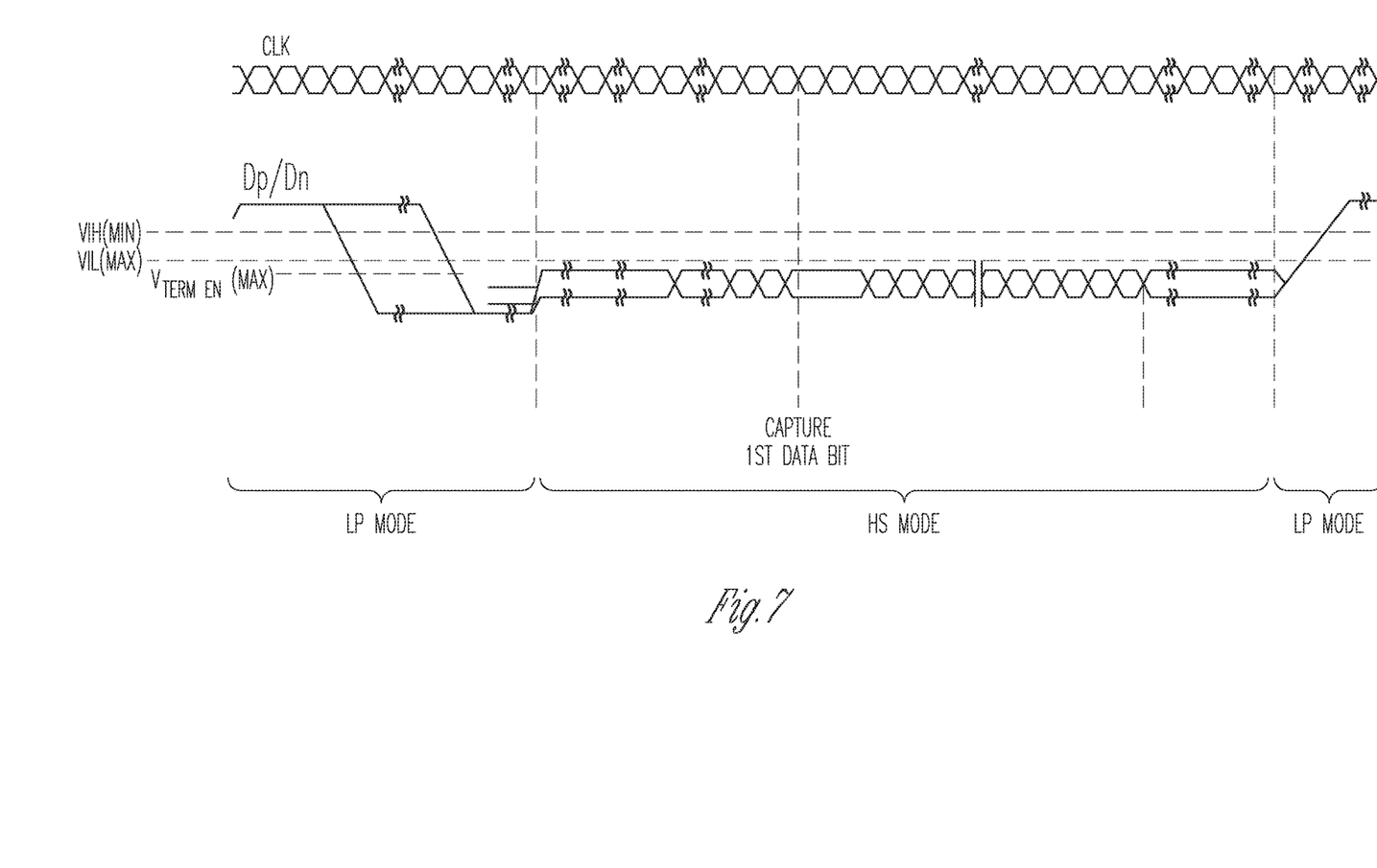
FIG. 7 is a timing diagram illustrating modes and states of a mobile industry processor interface (MIPI) in accordance with some embodiments.

FIG. 7 is a timing diagram illustrating modes and states of a MIPI D-PHY data lane. The top waveform shows the MIPI clock and the bottom waveform shows the data lane. The MIPI D-PHY operates in two modes; a low power (LP) mode and a high speed (HS) mode. FIG. 7 shows the MIPI beginning in the MIPI LP mode, transitioning to the MIPI HS mode, and returning to the MIPI LP mode. The MIPI LP mode operates with a higher voltage swing and slower transitions than the MIPI HS mode. In certain embodiments, the MIPI LP mode transitions according to low voltage complementary metal oxide semiconductor (LVCMOS) voltage levels. In certain embodiments, the MIPI LP mode transitions between about 1.2 Volts (1.2V) and circuit ground and operates at ten megabits per second (10 Mb/s). In certain embodiments, the MIPI HS mode uses a differential voltage that transitions between 140 millivolts (140 mV) and 270 mV. The data rate in MIPI HS mode may be extended to one gigabit per second (1 Gb/s).

Figure 8A:
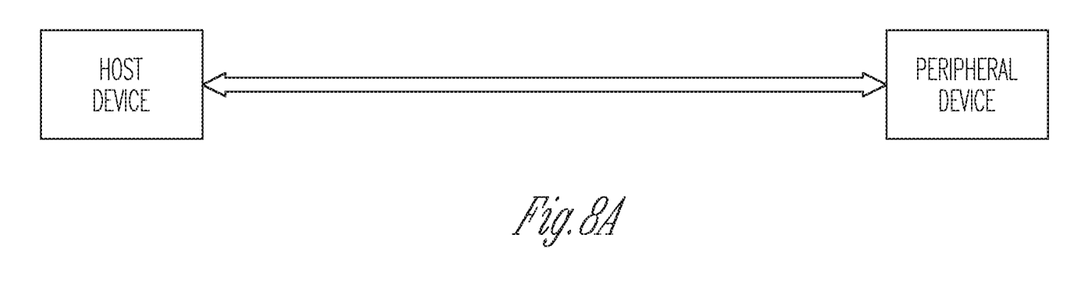
FIG. 8A is a block diagram of a conventional wired MIPI between a host device and a peripheral device
Figure 8B:
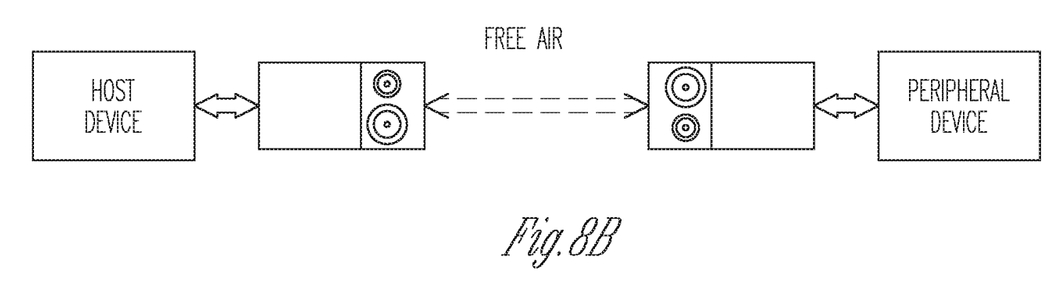
FIG. 8B is block diagram of an optical interface inserted into a wired MIPI, in accordance with some embodiments.

FIG. 8A is a block diagram of a conventional wired MIPI between a host device and a peripheral device. FIG. 8B is block diagram of an optical interface inserted into the wired MIPI. The optical interface includes TX/RX pairs and includes circuitry at the transmit side and the receive side in order for data transfer operations using the MIPI optical interface to be transparent to processors or clients of the host device and peripheral device. The circuitry also prevents the host and peripheral devices from experiencing latency in the data transfers due to the optical interface. One communication lane is shown in the embodiment of FIG. 8A. A processor circuit on either side of the communication lane (host side or peripheral side) initiates transmission of laser energy when initiating communication of signals according to the MIPI protocol.

Figure 9:
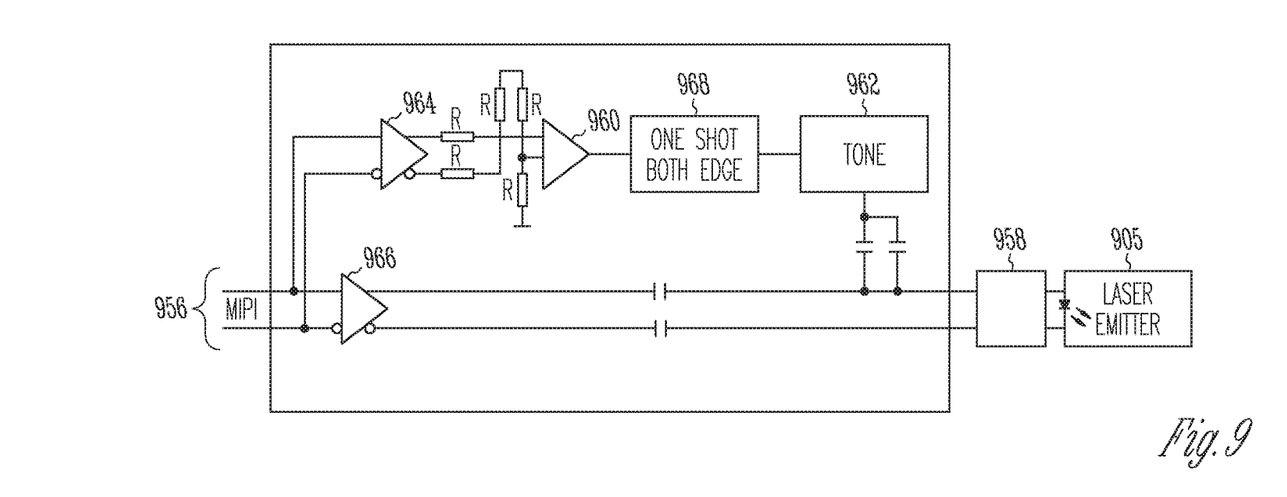
FIG. 9 is another schematic of circuitry on the transmit side of an optical interface in accordance with some embodiments.

FIG. 9 is a schematic of an embodiment of circuitry on the TX side of the optical interface to allow data transfer according to an MIPI communication protocol. The TX circuitry includes a laser emitter 905 that transmits laser energy from a host device across an air gap to a peripheral device or vice versa. The circuitry includes an MIPI 956. The TX circuitry also includes driver circuitry 958 that receives an electrical signal according to an MIPI protocol and drives the laser emitter according to the electrical signal. An embodiment of driver circuitry was discussed previously in regard to FIG. 6.

The TX circuitry also includes an MIPI mode detection circuit electrically coupled to the driver circuitry 958 and the MIPI 956. The MIPI mode detection circuit is configured to detect a change between the MIPI LP mode and the MIPI HS mode at the MIPI. The TX circuitry further includes a tone circuit 962 that generates a tone signal of a specified tone frequency. In certain embodiments, the tone circuit includes an oscillator circuit. The specified tone frequency is a higher frequency than the data rate of the MIPI HS mode. For example, if the data rate of the MIPI is 1 Gb/s, the tone frequency may be ten gigahertz (10 GHz). When the MIPI mode detection circuit detects a change between the MIPI LP mode and the MIPI HS mode at the MIPI, it injects or adds the tone signal to the electrical signal provided to the driver circuitry based on the detected change. The TX circuitry includes buffers 964 and 966. Buffer 964 provides the electrical signal to the resistive divider and comparator to detect the change in mode and the other buffer 966 passes the electrical signal to the driver circuitry 958. The tone circuit 962 adds the tone signal to the electrical signal passed to the driver circuitry. Thus, the tone signal rides on top of the LP mode or HS mode signals from the MIPI, and the tone signal and MIPI electrical signals are processed by the driver circuitry and included in the laser signals produced by the laser emitter 905.

In some embodiments, a direct current (DC) unbalanced tone signal is added to the electrical signal by the tone circuit. A DC unbalanced tone has a DC common mode offset voltage different from the electrical signal from the MIPI passed to the driver circuitry. On the RX side of the optical interface, the DC unbalanced tone will be converted from a laser signal to an electrical signal and processed as common node noise that can be removed from the electrical signal through signal processing.

The MIPI mode detection circuit may include a voltage level detector circuit. In the embodiment in FIG. 9, the voltage level detector circuit includes comparator 960. In certain embodiments, the MIPI mode detection circuit detects a transition from a voltage corresponding to MIPI LP mode to a voltage corresponding to MIPI HS mode. In certain embodiments, the MIPI mode detection circuit detects and detects a transition from a voltage corresponding to MIPI HS mode to a voltage corresponding to MIPI LP mode. In some embodiments, the TX circuitry includes a one shot circuit 968 (sometimes referred to as a monostable vibrator circuit). The one shot circuit may trigger from a low voltage level or '0' logic level to a high voltage level or '1' logic level for a predetermined period of time and then switch back to a low voltage level. The one shot circuit is used to monitor the output of the comparator 960. In certain embodiments, the one shot circuit triggers when the MIPI changes from the LP mode to the HS mode and the tone is included on the HS mode signal for the predetermined period of time. Alternatively, the one shot circuit triggers when the MIPI changes from the HS mode to the LP mode and the tone is included on the LP mode signal. In certain embodiments, the one shot circuit triggers on both transitions from HS mode to LP mode and LP mode to HS mode and enables the tone circuit to add the tone for the predetermined period of when either transition occurs.

In certain embodiments, the TX circuitry includes a toggle flip flop circuit electrically coupled to the output of the comparator 960 instead of a one shot circuit. The output of the toggle flip flop circuit may be the high level when the MIPI is sending electrical signals according to the HS mode and the tone circuit 962 adds the tone when the MIPI is in HS mode. Alternatively, the output of the toggle flip flop circuit may be the high level when the MIPI is sending electrical signals according to the LP mode and the tone circuit 962 adds the tone when the MIPI is in LP mode. In certain embodiments, the tone circuit 962 adds two tone signals to the electrical signals passed to the driver circuitry. The two tone signals have different specified tone frequencies. The first specified tone frequency signifies that the electrical signals are being sent according to the MIPI LP mode and the second specified tone frequency indicates the electrical signals are being sent according to the MIPI HS mode.

Figure 10:
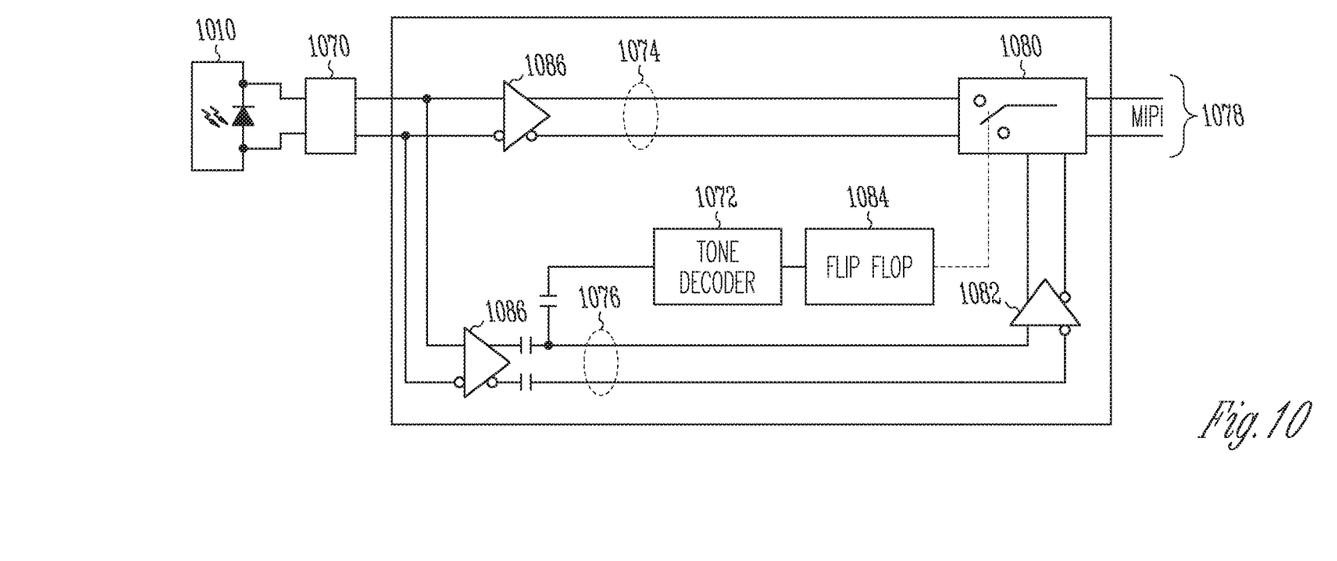
FIG. 10 is another schematic of circuitry on the receive side of an optical interface in accordance with some embodiments.

FIG. 10 is a schematic of an embodiment of circuitry on the RX side of the optical interface according to an MIPI communication protocol. The RX circuitry may be included in a host device or a peripheral device. The RX circuitry includes a photodiode 1010 and receiver circuitry 1070. The photodiode 1010 receives laser energy across the air gap from a separate device, and the receiver circuitry 1070 converts the received laser energy to a received electrical signal. An embodiment of receiver circuitry was discussed previously in regard to FIG. 5. If the received laser energy includes a tone frequency added by the TX side circuitry, the received electrical signal will include a tone signal component with the tone frequency.

The RX circuitry includes a tone detector circuit or tone decoder. The tone detector circuit 1072 detects the tone signal in the received electrical signal. In some embodiments, the tone detector circuit 1072 includes a phase locked loop (PLL) circuit to detect the tone frequency in the received electrical signal. The RX circuitry also includes logic circuitry that sends the received electrical signal as an electrical signal compatible with the MIPI LP mode or the MIPI HS mode according to the detected tone signal. In some embodiments, the logic circuitry includes a first circuit path 1074 and a second circuit path 1076. The logic circuitry may include a multiplexer circuit 1080 or Mux that selects the first circuit path or the second circuit path according to the detected tone signal. The first circuit path 1074 passes the converted electrical signal unchanged to the MIPI 1078 electrically coupled to the RX circuitry. Both of the circuit paths may include a buffer 1086 to provide drive for the signals along the circuit path. The second circuit path 1076 can include a voltage level buffer 1082. The voltage level buffer 1082 translates the received electrical signal to a voltage level compatible with the MIPI LP mode. In some embodiments, the voltage level buffer includes a low voltage complementary metal oxide semiconductor (LVCMOS) voltage level buffer 1082 that converts voltage levels of the received electrical signal to LVCMOS logic levels.

As explained previously herein, the tone signal may be added based on operation of a one shot circuit and may be added to the received electrical signal for a predetermined period of time when a transition between modes is detected. The logic circuitry may include a flip flop circuit 1084 to set the Mux to the correct circuit path. In certain embodiments, the tone signal is added to MIPI HS mode signals and the Mux selects the first circuit path 1074 when the tone is detected. In certain embodiments, the tone signal is added to MIPI LP mode signals and the Mux selects the second circuit path 1076 when the tone is detected. In certain embodiments, the tone signal is added to the received electrical signal for a predetermined time whenever a change in MIPI mode is detected and the Mux switches between the first circuit path 1074 and the second circuit path 1076 whenever the tone is detected. In certain embodiments, two tone frequencies are used; one to indicate MIPI HS mode and one to indicate MIPI LP mode. The Mux selects the first circuit path 1074 when the first tone frequency is detected and selects the second circuit path when the second tone frequency is detected. The tone detector circuit 1072 may include two PLL circuits; one for detecting each of the two tone frequencies.

The optical interface changes circuit paths when a voltage transition associated with a mode switch is detected. The optical interface can be used to transmit according to any protocol that is compatible with the voltage levels of the MIPI LP mode. Because a voltage transition won't be detected when using such a protocol, the second circuit path will remain selected and the TX circuitry and RX circuitry will operate normally.

Figure 11:
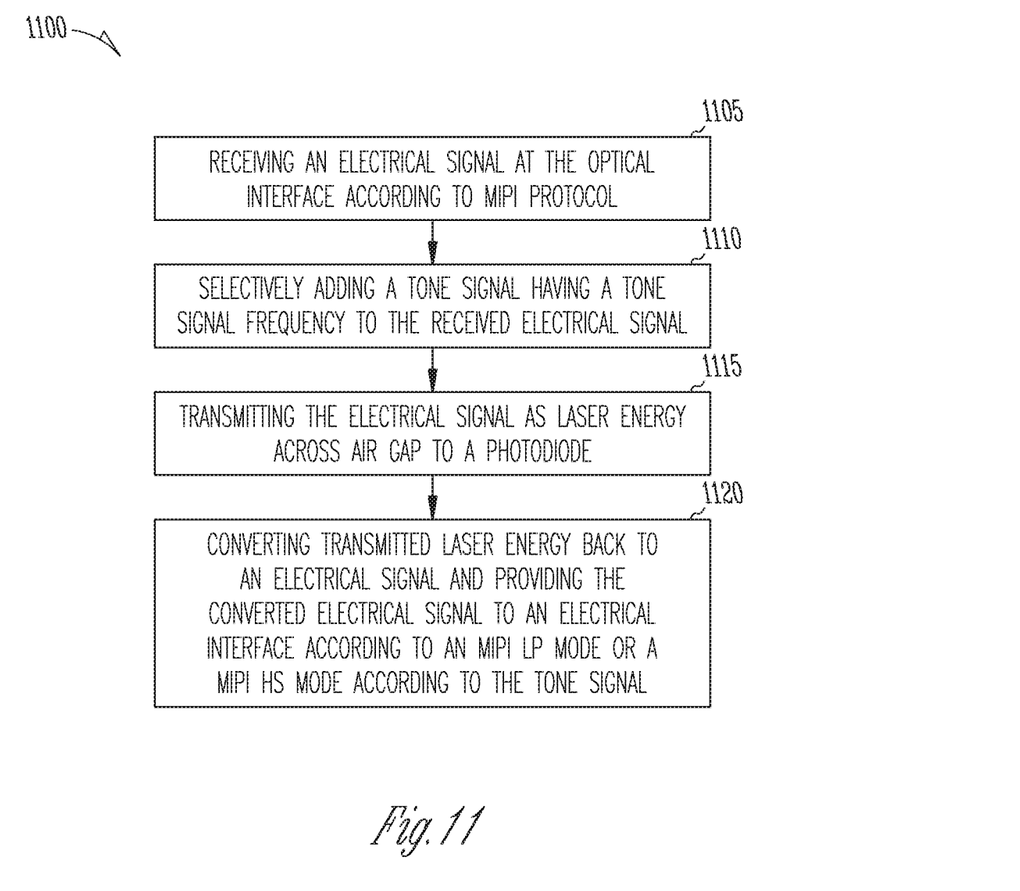
FIG. 11 is a flow diagram of a method of operating a free air optical interface in accordance with some embodiments.

FIG. 11 is a flow diagram of an embodiment of a method 1100 of operating a free air optical interface. At 1105, an electrical signal is received at the optical interface according to a MIPI protocol. The electrical signal may be received at transmit side circuitry of the optical interface from an MIPI.

At 1110, a tone signal is selectively added to the electrical signal before the signal is converted into an optical signal or laser energy signal. The tone signal indicates whether the electrical signal is a MIPI LP mode signal or a MIPI HS signal. The tone signal has a specific tone frequency and the tone frequency rides on the MIPI signal. In some embodiments, the tone signal is DC unbalanced and the tone frequency component is a DC unbalanced component of the combined tone and MIPI signal.

At 1115, the electrical signal is converted to a laser energy signal and transmitted as laser energy across an air gap to a photodiode. The laser energy signal includes the tone frequency. At 1120, the transmitted laser energy is converted by the photodiode back to an electrical signal. If the tone signal is unbalanced it will be treated as common mode noise by the receiver circuitry of the optical interface and will removed. The tone signal could also be reduced or moved from the converted electrical signal using signal filtering. The converted electrical signal is provided to an electrical interface. In some embodiments, the electrical interface is a MIPI and the converted electrical signal is provided to the MIPI according to the MIPI LP mode or the MIPI HS mode based on the tone signal. The tone signal may indicate the mode of the electrical signal and receiver circuitry may adjust the voltage level of the electrical signal to accommodate one or both of MIPI LP mode and MIPI HS mode.

The free air optical interface can be included in a personal computer (PC) or a mobile computing device such as a smart phone, tablet, compute stick, etc. The optical interface can be used to connect peripheral devices to the PC or mobile computing device. The optical interface can be included in a server, mini-server, or micro-server, and can be used for agnostic backplane connections to servers. The optical interface can be included in ultra-small or wearable devices where typical mechanical interconnections may be too bulky.

Figure 12:
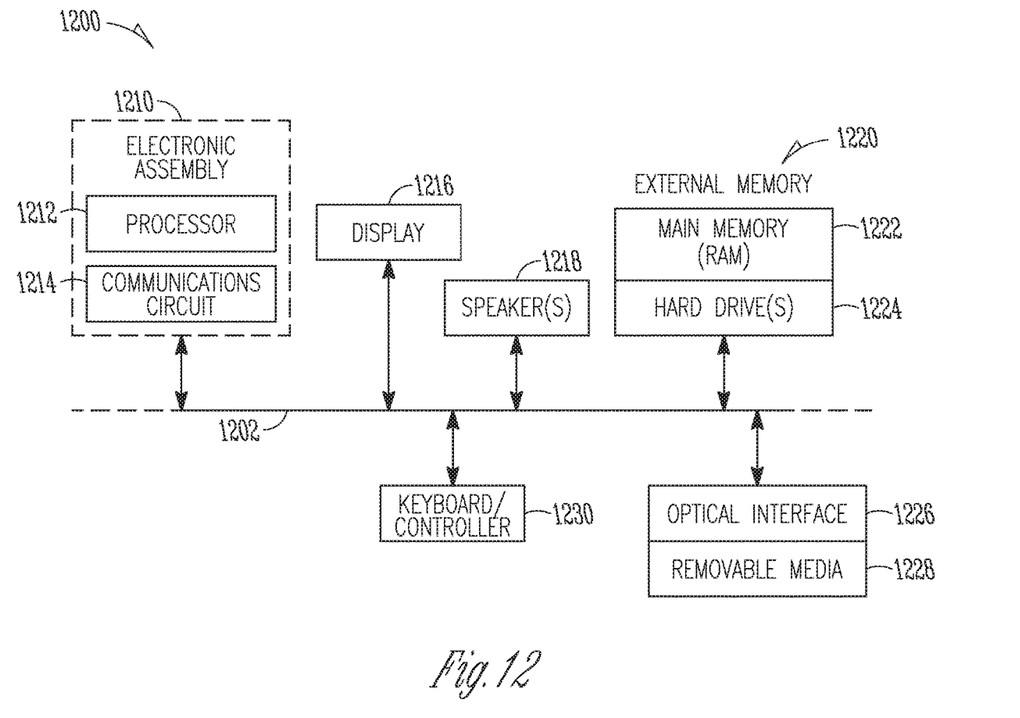
FIG. 12 is a block diagram of an example of an electronic system in accordance with some embodiments.

FIG. 12 is a block diagram of an example of an electronic system 1200 incorporating at least one electronic circuit assembly and in accordance with at least one embodiment of the invention. Electronic system 1200 is merely one example in which embodiments of the present invention can be used. Examples of electronic systems include, but are not limited to personal computers, tablet computers, mobile telephones, game devices, compute sticks etc. In this example, electronic system 1200 comprises a data processing system that includes a system bus 1202 to couple the various components of the system. System bus 1202 provides communications links among the various components of the electronic system 1200 and can be implemented as a single bus, as a combination of busses, or in any other suitable manner.

An electronic assembly 1210 can be coupled to system bus 1202. The electronic assembly 1210 can include any circuit or combination of circuits. In one embodiment, the electronic assembly 1210 includes a processor circuit 1212 which can be of any type. As used herein, "processor" circuit means any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, or any other type of processor or processing circuit.

Other types of circuits that can be included in the electronic assembly 1210 are a custom circuit, an application-specific integrated circuit (ASIC), or the like. The electronic assembly can include a communications circuit 1214 for use in wireless devices like mobile telephones, personal data assistants, portable computers, two-way radios, and similar electronic systems.

The electronic system 1200 can also include an external memory 1220, which in turn can include one or more memory elements suitable to the particular application, such as a main memory 1222 in the form of random access memory (RAM), one or more hard drives 1224. The electronic assembly 1210 can also include a free air optical interface 1226 for removable media 1228 such as compact disks (CD), flash memory cards, digital video disk (DVD), and the like. The electronic assembly 1210 and processor circuit 1212 may be included in a host device and the removable media 1228 may be included in a peripheral device.

The electronic system 1200 can also include a display device 1216, one or more speakers 1218, and a keyboard and/or controller 1230, which can include a mouse, trackball, touch screen, voice-recognition device, or any other device that permits a system user to input information into and receive information from the electronic system 1200.

ADDITIONAL DESCRIPTION AND EXAMPLES

Example 1 includes subject matter (such as an apparatus) comprising: a laser emitter configured to transmit laser energy across an air gap to a separate device; a mobile industry processor interface (MIPI); driver circuitry electrically coupled to the laser emitter, wherein the driver circuitry is configured to receive an electrical signal according to an MIPI protocol and drive the laser emitter according to the electrical signal; a tone circuit configured to generate a tone signal of a specified tone frequency; and an MIPI mode detection circuit electrically coupled to the driver circuitry and the MIPI, wherein the MIPI mode detection circuit is configured to detect a change between a MIPI low power (LP) mode and a MIPI high speed (HS) mode at the MIPI interface, and add the tone signal to an electrical signal provided to the driver circuitry from the MIPI according to the detected change.

In Example 2, the subject matter of Example 1 optionally includes an MIPI mode detection circuit includes a voltage level detector circuit configured to detect a change in voltage level at the MIPI, and wherein the MIPI detection circuit is configured to add the tone signal to the electrical signal according to the detected voltage level.

In Example 3, the subject matter of Example 2 optionally includes an MIPI mode detection circuit that includes a one-shot circuit configured to enable the tone circuit for a specified period of time after detecting the change in voltage level.

In Example 4, the subject matter of one or any combination of Examples 1-3 optionally includes a tone circuit configured to selectively generate the tone signal to include either a first specified tone frequency or a second specified tone frequency to the electrical signal; wherein the MIPI mode detection circuit includes a voltage level detector circuit configured to detect a change in voltage level at the MIPI and add the tone signal with either the first specified tone frequency or the second specified tone frequency according to the detected voltage level.

In Example 5, the subject matter of one or any combination of Examples 1-4 optionally includes an MIPI mode detection circuit configured to add a direct current (DC) unbalanced tone signal to the electrical signal.

In Example 6, the subject matter of one or any combination of Examples 1-5 optionally includes a photodiode configured to receive laser energy across the air gap from the separate device, wherein the laser emitter and the photodiode are arranged on a same substrate; and receiver circuitry electrically coupled to the photodiode and configured to convert the received laser energy to a received electrical signal.

In Example 7, the subject matter of Example 6 optionally includes a tone detector circuit configured to detect a tone signal in the received electrical signal; and logic circuitry electrically coupled to the receiver circuitry and the MIPI, wherein the logic circuitry is configured to provide the received electrical signal to the MIPI as an electrical signal compatible with the MIPI HS mode or the MIPI LP mode according to the detected tone signal.

In Example 8, the subject matter of one or any combination of Examples 1-7 optionally includes a processor circuit electrically coupled to the MIPI and configured to communicate data according to an MIPI protocol.

Example 9 can include subject matter (such as an apparatus), or can optionally be combined with one or any combination of Examples 1-8 to include such subject matter comprising a photodiode configured to receive laser energy across an air gap from a separate device; receiver circuitry electrically coupled to the photodiode and configured to convert the received laser energy to a received electrical signal; a tone detector circuit configured to detect a tone signal in the received electrical signal; and logic circuitry electrically coupled to the receiver circuitry and the tone detector circuit, wherein the logic circuitry is configured to send the received electrical signal as an electrical signal compatible with a mobile industry processor interface (MIPI) low power (LP) mode or a MIPI high speed (HS) mode according to the detected tone signal.

In Example 10, the subject matter of Example 9 can optionally include logic circuitry electrically coupled to an MIPI; wherein the logic circuitry includes a first circuit path configured to pass the converted electrical signal unchanged to the MIPI, and a second circuit path including a voltage level buffer, wherein the voltage level buffer is configured to translate the received electrical signal to a voltage level compatible with the MIPI LP mode; and wherein the tone detector circuit is configured to enable the first circuit path or the second circuit path according to the detected tone signal.

In Example 11, the subject matter of Example 9 or 10 optionally includes a tone detector circuit that includes a phase locked loop configured to detect the tone signal and a multiplexer circuit to select the first circuit path or the second circuit path according to the detected tone signal.

In Example 12, the subject matter of Example 10 or 11 optionally includes a voltage level buffer that includes a low voltage complementary metal oxide semiconductor (LVC-MOS) voltage level buffer.

In Example 13, the subject matter of one or any combination of Examples 9-12 optionally includes a tone detector circuit configured to detect a first tone signal that indicates the MIPI HS mode and a second tone signal that indicates the MIPI LP mode.

Example 14 includes subject matter (such as an apparatus), or can optionally be combined with one or any combination of Examples 1-13 to include such subject matter, comprising: an optical interface, the optical interface including: an optical interface host side including: a host-side laser emitter; host-side driver circuitry, wherein the host-side driver circuitry is electrically coupled to a host-side mobile industry processor interface (MIPI); a host-side tone circuit configured to generate a tone signal of a specified tone frequency; and an MIPI mode detection circuit electrically coupled to the driver circuitry and the host-side MIPI, wherein the MIPI mode detection circuit is configured to detect a change between a MIPI low power (LP) mode and a MIPI high speed (HS) mode at the host-side MIPI, and add the tone signal according to the detected change to an electrical signal to be transmit as a laser signal; and an optical interface peripheral side separated from the optical interface host side by an air space, the optical interface peripheral side including: a peripheral-side photodiode; peripheral-side receiver circuitry, wherein the peripheral-side receiver circuitry is configured to convert the received laser energy to a received electrical signal; a peripheral-side tone detector circuit configured to detect a tone signal in the received electrical signal; and peripheral-side logic circuitry electrically coupled to the receiver circuitry and a peripheral-side MIPI, wherein the logic circuitry is configured to provide the received electrical signal to the peripheral-side MIPI as an electrical signal compatible with the MIPI HS mode or the MIPI LP mode according to the detected tone signal.

In Example 15, the subject matter of Example 14 optionally includes: a peripheral-side laser emitter; peripheral-side driver circuitry; a host-side photodiode; and host-side receiver circuitry; wherein the host-side photodiode and host-side laser emitter are arranged on a first substrate and the peripheral-side photodiode and peripheral-side laser emitter are arranged on a second substrate.

In Example 16, the subject matter of one or both of Examples 14 and 15 optionally includes a host-side tone detector circuit and a peripheral-side tone circuit, wherein laser energy that includes a tone frequency is communicated according to a duplex MIPI communication protocol using the optical interface.

In Example 17, the subject matter of one or any combination of Examples 14-16 optionally includes a host processor circuit electrically coupled to the optical interface host side, wherein the processor circuit is configured to initiate transmission of pulses of laser energy by the host-side laser emitter according to an MIPI communication protocol.

In Example 18, the subject matter of one or any combination of Examples 14-17 optionally includes a host-side tone circuit is configured to generate a direct current (DC) unbalanced tone signal and add the DC unbalanced tone signal to the electrical signal to be transmit as a laser signal.

In Example 19, the subject matter of one or any combination of Examples 14-18 optionally includes a tone detector circuit that includes a phase locked loop configured to detect the tone signal.

In Example 20, the subject matter of one or any combination of Examples 14-19 optionally includes logic circuitry electrically coupled to an MIPI; wherein the logic circuitry includes a first circuit path configured to pass the converted electrical signal unchanged to the MIPI, and a second circuit path including a voltage level buffer; wherein the voltage level buffer is configured to translate the received electrical signal to a voltage level compatible with the MIPI LP mode; and wherein the peripheral-side tone detector circuit is configured to enable the first circuit path or the second circuit path according to the detected tone signal.

Example 21 can include subject matter (such as a method of operating an optical interface, a means for performing acts, or a machine-readable medium including instructions that, when performed by the machine, cause the machine to perform acts), or can optionally be combined with the subject matter of one or any combination of Examples 1-20 to include such subject matter, comprising: receiving an electrical signal at the optical interface according to a mobile industry processor interface (MIPI) protocol; selectively adding a tone signal having a tone signal frequency to the received electrical signal; transmitting the electrical signal as laser energy across an air gap to a photodiode; and converting transmitted laser energy back to an electrical signal and providing the converted electrical signal to an electrical interface according to an MIPI low power (LP) mode or a MIPI high speed (HS) mode according to the tone signal.

In Example 22, the subject matter of Example 21 can optionally include detecting a change in voltage level at an MIPI electrically coupled to the optical interface, and adding the tone signal to the electrical signal according to the detected voltage level.

In Example 23, the subject matter of one or both of Examples 21 and 22 optionally includes passing the converted electrical signal unchanged to an MIPI electrically coupled to the optical interface when the tone signal indicates that the electrical signal is communicated according to the MIPI HS mode, and translate the converted electrical signal to a voltage level compatible with the MIPI LP mode when the tone signal indicates that the electrical signal is communicated according to the MIPI LP mode.

In Example 24, the subject matter of any one of Examples 21-23 optionally includes selectively adding a tone signal includes selectively adding a direct current (DC) unbalanced tone signal to the received electrical signal.

Example 25 can include subject matter (such as an apparatus), or can optionally be combined with subject matter of one or any combination of Examples 1-24 to include such subject matter, comprising: means for receiving an electrical signal at the optical interface according to a mobile industry processor interface (MIPI) protocol; means for selectively adding a tone signal having a tone signal frequency to the received electrical signal; means for transmitting the electrical signal as laser energy across an air gap to a photodiode; and means for converting transmitted laser energy back to an electrical signal and providing the converted electrical signal to an electrical interface according to an MIPI low power (LP) mode or a MIPI high speed (HS) mode according to the tone signal.

In Example 26, the subject matter of Example 25 optionally includes means for detecting a change in voltage level at an MIPI electrically coupled to the optical interface, and adding the tone signal to the electrical signal according to the detected voltage level.

In Example 27, the subject matter of one or both of Example 25 and Example 26 optionally includes means for passing the converted electrical signal unchanged to an MIPI electrically coupled to the optical interface when the tone signal indicates that the electrical signal is communicated according to the MIPI HS mode, and means for translating the converted electrical signal to a voltage level compatible with the MIPI LP mode when the tone signal indicates that the electrical signal is communicated according to the MIPI LP mode.

In Example 28, the subject matter of one or any combination of Examples 25-27 optionally includes means for selectively adding a direct current (DC) unbalanced tone signal to the received electrical signal.

These several non-limiting embodiments and examples can be combined using any permutation or combination. The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus comprising:
   a laser emitter configured to transmit laser energy across an air gap to a separate device;
   a mobile industry processor interface (MIPI);
   driver circuitry electrically coupled to the laser emitter, wherein the driver circuitry is configured to receive an electrical signal according to an MIPI protocol and drive the laser emitter according to the electrical signal;
   a tone circuit configured to generate a tone signal of a specified tone frequency; and
   an MIPI mode detection circuit electrically coupled to the driver circuitry and the MIPI, wherein the MIPI mode detection circuit is configured to detect a change between a MIPI low power (LP) mode and a MIPI high speed (HS) mode at the MIPI interface, and add the tone signal to an electrical signal provided to the driver circuitry from the MIPI according to the detected change.

2. The apparatus of claim 1, wherein the MIPI mode detection circuit includes a voltage level detector circuit configured to detect a change in voltage level at the MIPI, and wherein the MIPI detection circuit is configured to add the tone signal to the electrical signal according to the detected voltage level.

3. The apparatus of claim 2, wherein MIPI mode detection circuit includes a one-shot circuit configured to enable the tone circuit for a specified period of time after detecting the change in voltage level.

4. The apparatus of claim 1, wherein the tone circuit is configured to selectively generate the tone signal to include either a first specified tone frequency or a second specified tone frequency to the electrical signal; wherein the MIPI mode detection circuit includes a voltage level detector circuit configured to detect a change in voltage level at the MIPI and add the tone signal with either the first specified tone frequency or the second specified tone frequency according to the detected voltage level.

5. The apparatus of claim 1, wherein the MIPI mode detection circuit is configured to add a direct current (DC) unbalanced tone signal to the electrical signal.

6. The apparatus of claim 1, including:
   a photodiode configured to receive laser energy across the air gap from the separate device, wherein the laser emitter and the photodiode are arranged on a same substrate; and
   receiver circuitry electrically coupled to the photodiode and configured to convert the received laser energy to a received electrical signal.

7. The apparatus of claim 6, including:
   a tone detector circuit configured to detect a tone signal in the received electrical signal; and
   logic circuitry electrically coupled to the receiver circuitry and the MIPI, wherein the logic circuitry is configured to provide the received electrical signal to the MIPI as an electrical signal compatible with the MIPI HS mode or the MIPI LP mode according to the detected tone signal.

8. The apparatus of claim 1, including a processor circuit electrically coupled to the MIPI and configured to communicate data according to an MIPI protocol.

9. An apparatus comprising:
   a photodiode configured to receive laser energy across an air gap from a separate device;
   receiver circuitry electrically coupled to the photodiode and configured to convert the received laser energy to a received electrical signal;
   a tone detector circuit configured to detect a tone signal in the received electrical signal; and
   logic circuitry electrically coupled to the receiver circuitry and the tone detector circuit, wherein the logic circuitry is configured to send the received electrical signal as an electrical signal compatible with a mobile industry processor interface (MIPI) low power (LP) mode or a MIPI high speed (HS) mode according to the detected tone signal.

10. The apparatus of claim 9, wherein the logic circuitry is electrically coupled to an MIPI; wherein the logic circuitry includes a first circuit path configured to pass the converted electrical signal unchanged to the MIPI, and a second circuit path including a voltage level buffer, wherein the voltage level buffer is configured to translate the received electrical signal to a voltage level compatible with the MIPI LP mode; and wherein the tone detector circuit is configured to enable the first circuit path or the second circuit path according to the detected tone signal.

11. The apparatus of claim 10, wherein the tone detector circuit includes a phase locked loop configured to detect the tone signal and a multiplexer circuit to select the first circuit path or the second circuit path according to the detected tone signal.

12. The apparatus of claim 10, wherein the voltage level buffer includes a low voltage complementary metal oxide semiconductor (LVCMOS) voltage level buffer.

13. The apparatus of claim 9, wherein the tone detector circuit is configured to detect a first tone signal that indicates the MIPI HS mode and a second tone signal that indicates the MIPI LP mode.

14. An apparatus comprising an optical interface, the optical interface including:
 an optical interface host side including:
  a host-side laser emitter;
  host-side driver circuitry, wherein the host-side driver circuitry is electrically coupled to a host-side mobile industry processor interface (MIPI);
  a host-side tone circuit configured to generate a tone signal of a specified tone frequency; and
  an MIPI mode detection circuit electrically coupled to the driver circuitry and the host-side MIPI, wherein the MIPI mode detection circuit is configured to detect a change between a MIPI low power (LP) mode and a MIPI high speed (HS) mode at the host-side MIPI, and add the tone signal according to the detected change to an electrical signal to be transmit as a laser signal; and
 an optical interface peripheral side separated from the optical interface host side by an air space, the optical interface peripheral side including:
  a peripheral-side photodiode;
  peripheral-side receiver circuitry, wherein the peripheral-side receiver circuitry is configured to convert the received laser energy to a received electrical signal;
  a peripheral-side tone detector circuit configured to detect a tone signal in the received electrical signal, and
  peripheral-side logic circuitry electrically coupled to the receiver circuitry and a peripheral-side MIPI, wherein the logic circuitry is configured to provide the received electrical signal to the peripheral-side MIPI as an electrical signal compatible with the MIPI HS mode or the MIPI LP mode according to the detected tone signal.

15. The apparatus of claim 14, further including: a peripheral-side laser emitter; peripheral-side driver circuitry; a host-side photodiode; and host-side receiver circuitry; wherein the host-side photodiode and host-side laser emitter are arranged on a first substrate and the peripheral-side photodiode and peripheral-side laser emitter are arranged on a second substrate.

16. The apparatus of claim 15, including a host-side tone detector circuit and a peripheral-side tone circuit, wherein laser energy that includes a tone frequency is communicated according to a duplex MIPI communication protocol using the optical interface.

17. The apparatus of claim 14, including a host processor circuit electrically coupled to the optical interface host side, wherein the processor circuit is configured to initiate transmission of pulses of laser energy by the host-side laser emitter according to an MIPI communication protocol.

18. The apparatus of claim 14, wherein the host-side tone circuit is configured to generate a direct current (DC) unbalanced tone signal and add the DC unbalanced tone signal to the electrical signal to be transmit as a laser signal.

19. The apparatus of claim 14, wherein the tone detector circuit includes a phase locked loop configured to detect the tone signal.

20. The apparatus of claim 14, wherein the logic circuitry is electrically coupled to an MIPI; wherein the logic circuitry includes a first circuit path configured to pass the converted electrical signal unchanged to the MIPI, and a second circuit path including a voltage level buffer; wherein the voltage level buffer is configured to translate the received electrical signal to a voltage level compatible with the MIPI LP mode; and wherein the peripheral-side tone detector circuit is configured to enable the first circuit path or the second circuit path according to the detected tone signal.

21. A method of operating an optical interface, the method comprising:
 receiving an electrical signal at the optical interface according to a mobile industry processor interface (MIPI) protocol;
 selectively adding a tone signal having a tone signal frequency to the received electrical signal;
 transmitting the electrical signal as laser energy across an air gap to a photodiode; and
 converting transmitted laser energy back to an electrical signal and providing the converted electrical signal to an electrical interface according to an MIPI low power (LP) mode or a MIPI high speed (HS) mode according to the tone signal.

22. The method of claim 21, wherein selectively adding a tone signal includes detecting a change in voltage level at an MIPI electrically coupled to the optical interface, and adding the tone signal to the electrical signal according to the detected voltage level.

23. The method of claim 21, including passing the converted electrical signal unchanged to an MIPI electrically coupled to the optical interface when the tone signal indicates that the electrical signal is communicated according to the MIPI HS mode, and translate the converted electrical signal to a voltage level compatible with the MIPI LP mode when the tone signal indicates that the electrical signal is communicated according to the MIPI LP mode.

24. The method of claim 21, wherein selectively adding a tone signal includes selectively adding a direct current (DC) unbalanced tone signal to the received electrical signal.

* * * * *

UNITED STATES PATENT AND TRADEMARK OFFICE
CERTIFICATE OF CORRECTION

PATENT NO. : 10,554,304 B2
APPLICATION NO. : 16/326723
DATED : February 4, 2020
INVENTOR(S) : Arvind Sundaram It is certified that error appears in the above-identified patent and that said Letters Patent is hereby corrected as shown below:

On the Title Page

Item (71), in "Applicant", in Column 1, Line 2-3, delete "(US); Arvind Sundaram, Bangalore (IN)" and insert --(US)-- therefor In Column 2, under "Foreign Patent Documents", Line 1, delete "307651" and insert --3073651-- therefor In the Claims In Column 15, Line 38, in Claim 14, delete "signal," and insert --signal;-- therefor Signed and Sealed this
Twenty-seventh Day of August, 2024

Katherine Kelly Vidal
*Director of the United States Patent and Trademark Office*